US011872931B1

(12) United States Patent
Schellens (10) Patent No.: US 11,872,931 B1
(45) Date of Patent: Jan. 16, 2024

(54) TAILGATE AND ROOFTOP MOUNTED WARNING OR EMERGENCY LIGHTS

(71) Applicant: Thomas E. Schellens, Old Lyme, CT (US)

(72) Inventor: Thomas E. Schellens, Old Lyme, CT (US)

( * ) Notice: Subject to any disclaimer, the term of this patent is extended or adjusted under 35 U.S.C. 154(b) by 0 days.

(21) Appl. No.: 17/868,491

(22) Filed: Jul. 19, 2022

Related U.S. Application Data

(60) Provisional application No. 63/236,631, filed on Aug. 24, 2021, provisional application No. 63/225,904, filed on Jul. 26, 2021.

(51) Int. Cl.
*B60Q 1/52* (2006.01)
*B60Q 1/30* (2006.01)

(52) U.S. Cl.
CPC .............. *B60Q 1/52* (2013.01); *B60Q 1/30* (2013.01)

(58) Field of Classification Search
CPC ........... B60Q 1/52; B60Q 1/30; B60Q 1/301; B60Q 1/3015
See application file for complete search history.

(56) References Cited

U.S. PATENT DOCUMENTS

| | | | |
|---|---|---|---|
| D642,952 S | 8/2011 | Elwell | D10/121 |
| 8,511,526 B2 * | 8/2013 | Schellens | B60Q 1/2615 224/400 |
| 8,933,817 B2 * | 1/2015 | Caudill | B60Q 1/52 340/471 |
| 9,205,774 B2 * | 12/2015 | Kennemer | F21V 21/145 |
| 10,156,336 B2 | 12/2018 | Elwell et al. | F21S 43/14 |
| 10,246,006 B1 * | 4/2019 | Stowell | F21S 43/14 |
| 10,281,095 B2 | 5/2019 | Elwell et al. | F21S 4/28 |
| 10,351,050 B1 | 7/2019 | Elwell | B60Q 1/22 |
| 10,479,282 B2 | 11/2019 | Schellens | B60R 9/04 |
| D877,040 S | 3/2020 | Schellens | D12/412 |
| 10,598,332 B1 * | 3/2020 | Elwell | B60Q 1/52 |
| 10,634,305 B1 | 4/2020 | Elwell et al. | F21S 43/14 |
| 10,703,266 B1 * | 7/2020 | Butler | E01F 9/662 |
| 10,755,613 B2 * | 8/2020 | Brubaker | B60R 13/10 |
| 10,775,006 B2 | 9/2020 | Elwell et al. | F21S 4/28 |
| D899,384 S | 10/2020 | Elwell et al. | D13/180 |
| 10,837,615 B2 | 11/2020 | Elwell et al. | F21S 43/14 |
| 10,859,229 B1 | 12/2020 | Elwell et al. | F21S 43/14 |
| D920,933 S | 6/2021 | Elwell et al. | D10/180 |
| D922,671 S | 6/2021 | Elwell | D26/138 |
| D922,672 S | 6/2021 | Elwell | D26/138 |
| D922,673 S | 6/2021 | Elwell | D26/138 |
| 11,022,268 B2 | 6/2021 | Elwell et al. | F21S 43/14 |
| 11,220,208 B1 | 1/2022 | Schellens | B60Q 3/001 |
| 11,300,266 B1 * | 4/2022 | Singh | F21S 43/195 |

(Continued)

*Primary Examiner* — Nay Tun
(74) *Attorney, Agent, or Firm* — Fattibene and Fattibene, LLC; Paul A. Fattibene (57) ABSTRACT

A warning and emergency light module removably attached to a tailgate of a vehicle. A contoured fixture having a length and couture to match a panel of the tailgate holds a light bar within a channel. End caps placed on the opposing ends of the assist in holding the light bar ends in the channel and the contoured fixture on the tailgate of the vehicle. In another embodiment, a warning and emergency light module is attached to a roof of a vehicle so that lights forming an array extend longitudinally along the side of the vehicle. Visibility in all directions and functionality of an emergency vehicle is enhanced.

10 Claims, 8 Drawing Sheets

(56) References Cited

U.S. PATENT DOCUMENTS

| | | | |
|---|---|---|---|
| 11,305,824 B1 | 4/2022 | Schellens | B62D 33/023 |
| 2003/0090569 A1* | 5/2003 | Poechmueller | B60Q 1/0023 |
| | | | 348/E7.086 |
| 2005/0072350 A1* | 4/2005 | Aasgaard | B60Q 1/52 |
| | | | 340/471 |
| 2005/0146888 A1* | 7/2005 | Metcalf | B60Q 1/305 |
| | | | 362/543 |
| 2008/0055725 A1* | 3/2008 | Dornbos | B60Q 1/301 |
| | | | 359/546 |
| 2008/0180962 A1* | 7/2008 | Edmond | B62J 6/045 |
| | | | 362/473 |
| 2011/0295697 A1* | 12/2011 | Boston | G06Q 30/0272 |
| | | | 340/466 |
| 2012/0044429 A1* | 2/2012 | Guerra | F16M 11/041 |
| | | | 348/837 |
| 2014/0268775 A1* | 9/2014 | Kennemer | F21V 21/145 |
| | | | 362/369 |
| 2014/0300462 A1* | 10/2014 | Russ | B60Q 1/2692 |
| | | | 340/471 |
| 2014/0300463 A1* | 10/2014 | Russ | B60Q 1/46 |
| | | | 340/471 |
| 2016/0090034 A1* | 3/2016 | Brown | B60Q 1/2615 |
| | | | 340/468 |
| 2016/0114723 A1* | 4/2016 | Shipley | G09F 21/048 |
| | | | 701/70 |
| 2016/0129824 A1* | 5/2016 | Adriani | B60P 1/435 |
| | | | 29/401.1 |
| 2019/0213931 A1* | 7/2019 | Brubaker | B60Q 1/2607 |
| 2021/0155138 A1 | 5/2021 | Schellens | B60N 3/001 |
| 2022/0396196 A1* | 12/2022 | Hull | B60Q 1/30 |

* cited by examiner

TAILGATE AND ROOFTOP MOUNTED WARNING OR EMERGENCY LIGHTS

RELATED APPLICATIONS

This application claims the benefit of U.S. Provisional Application No. 63/236,631 filed Aug. 24, 2021 and U.S. Provisional Application No. 63/225,904 filed Jul. 26, 2021, both of which are herein incorporated by reference.

FIELD OF THE INVENTION

The present invention relates in general to mounting a light to a vehicle and more particularly to mounting a warning or emergency light to a vehicle without any permanent modification or minimal modification to the vehicle.

BACKGROUND OF THE INVENTION

Warning or emergency lights are often needed to be installed on vehicles after the vehicles have been manufactured and sold. In many situations it is necessary to install warning or emergency lights on the vehicle without modifying or minimally modifying the vehicle and also to permit removal so that the vehicle can be put into its original condition upon removal of the warning or emergency lights. This is often required when the vehicle is returned to a use that does not require the warning or emergency lights.

One such device is disclosed in U.S. Pat. No. 10,479,282 entitled "Accessory Mount for a Vehicle" issuing to Thomas E. Schellens on Nov. 19, 2019, which is herein incorporated by reference. Therein disclosed is a mount for attaching to a roof of a vehicle with the use of an existing brake light opening. A horizontal mounting surface is used to attach accessories, such as emergency and warning lights.

Another device is disclosed in U.S. Pat. No. 8,511,526 entitled "Vehicle Mounting Platform Using Existing Opening" issuing to Thomas E Schellens on Aug. 20, 2013, which is herein incorporated by reference. Therein disclosed is a mounting platform attached to the roof of a vehicle with a clamp placed through a break light assembly opening. The mounting platform is used to mount accessories such as light bars, emergency lights or antennas.

Another device is disclosed in U.S. Pat. No. 10,281,095 entitled "Light Bar" issuing to James P. Elwell and Tian Xiaojun. Therein disclosed is light bar including a row of white, amber, and red LEDs on a circuit board installed using a plurality of adhesively attached clips. The circuit board is separated into segments that are independently controllable.

While these prior devices have been useful in mounting accessories including warning or emergency lights on the roof of a vehicle, in some applications the height of the warning or emergency lights compromise their visibility, especially to closely approaching or trailing vehicles.

Other devices used for mounting emergency or warning lights have also resulted in the emergency or warning lights being positioned to high or low so as not to be clearly visible, especially to approaching or trailing vehicles. In most circumstances, law enforcement vehicles have roof mounted light bars to warn oncoming vehicles from a distance. Emergency warning lights have also been mounted to the interior top rear windows of the vehicle as well as below the bumper of the vehicle. Therefore, many prior devices used for the installation of emergency or warning lights have been located either too high or too low on the vehicle to act as an anti-collision deterrent in close proximity to trailing traffic situations. Emergency or warning lights require unimpeded visibility to conform to National Highway Safety Board requirements for emergency vehicles and to facilitate safe roadways. All of these prior emergency or warning lights operate independently of the vehicle breaking and warning light systems.

In other situations an emergency vehicle is often needed to be clearly visible on a side of a vehicle. Often emergency vehicles must block traffic or turn broadside or sideways making rearward or front facing lights difficult to see or with the vehicle not being clearly visible to oncoming traffic. This also occurs when an emergency vehicle must be angled relative to the direction of traffic. Therefore there is an additional need for a warning and emergency lighting system that can also be clearly visible from a side of the vehicle and not just from the front or back.

While these prior devices have been adequate, there is a need for easily mounting a warning or emergency light in a more clearly visible location for closely trailing or approaching traffic or on the side of a vehicle so as to be clearly seen.

SUMMARY OF THE INVENTION

The present invention is a module for mounting a warning or emergency light onto a panel surface of a tailgate of a vehicle. A contoured fixture holds a light bar in a longitudinal channel. The contoured fixture attaches to a tailgate panel surface using existing openings in the tailgate of the vehicle. End caps placed on opposing ends of the contoured fixture also have adhesive to adhere the ends of the contoured fixture to the tailgate panel surface. A warning or emergency light bar is placed within the contoured fixture. A light bar electrical coupling connects to the vehicle's electrical system. Control of the lighting of the warning or emergency light bar can be performed by the vehicle's electrical system or a separate connected controller.

In another embodiment of the present invention a roof warning and emergency light module is mounted on the roof of the vehicle to provide a clearly visible warning and emergency light from the side of the vehicle. A roof warning or emergency light module having a longitudinal array of lights is mounted on the roof of the vehicle. The warning or emergency light module has rails with lights running longitudinally along the rail mounted on the roof of the vehicle.

It is an object of the present invention to easily mount a warning or emergency light on a tailgate of a vehicle.

It is another object of the present invention to provide improved visibility of a warning or emergency light when mounted on the tailgate of a vehicle.

It is an advantage of the present invention that the warning or emergency light may be mounted on the tailgate of the vehicle without having to drill any holes in the vehicle.

It is another advantage of the present invention that the warning or emergency light may be easily attached and removed from the tailgate of the vehicle without modification or damage to the vehicle.

It is feature of the present invention that existing holes in the vehicle tailgate are used to mount the warning or emergency light.

It is another feature of the present invention that it is mounted at a vertical midpoint location on the tailgate of a vehicle.

It is yet another feature of the present invention that the warning or emergency light extends substantially the entire width of the tailgate of the vehicle.

It is a further feature of the present invention that a contoured fixture with a longitudinal channel holds a warning or emergency light bar.

It is an object of an embodiment of the present invention to easily mount a warning or emergency light on a roof of a vehicle.

It is another object of an embodiment of the present invention to provide improved side visibility a side of a vehicle with a warning or emergency light when mounted on the roof of a vehicle.

It is an advantage of an embodiment of the present invention that the warning or emergency light may be mounted on the roof of the vehicle with minimal modification to the vehicle.

It is another advantage of an embodiment of the present invention that the warning or emergency light may be easily removed from the roof of the vehicle with minimal modification to the vehicle.

It is feature of an embodiment of the present invention that existing mounting points on the vehicle may be used to mount the warning or emergency light to a roof of a vehicle.

It is another feature of an embodiment of the present invention that an array of lights forming a warning or emergency light is placed on a rail mounted longitudinally on the roof of a vehicle.

It is another feature of an embodiment of the present invention that the warning or emergency light extends a substantial portion of the length of the roof of the vehicle.

It is another feature of an embodiment of the present invention that a rail light fixture with a longitudinal open channel holds an array of lights forming a warning or emergency light.

It is another feature of an embodiment of the present invention that a light mounting strip is used to facilitate assembly of an array of lights forming a warning or emergency light.

These and other objects, advantages, and features will become readily apparent in view of the following more detailed description.

DETAILED DESCRIPTION OF THE PREFERRED EMBODIMENTS

Figure 1:
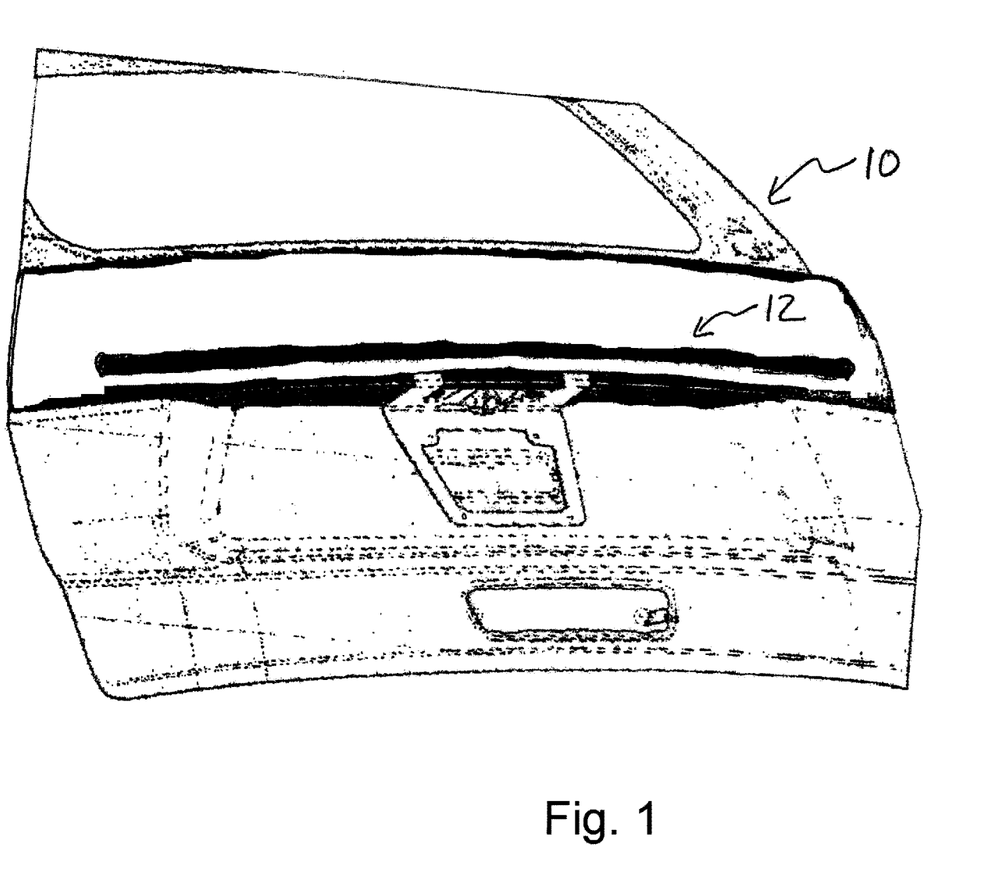
FIG. 1 is a perspective view schematically illustrating a tailgate of a vehicle with the present invention mounted thereon.

FIG. 1 schematically illustrates a warning or emergency light module 12 of the present invention attached to the tailgate 10 of a vehicle, preferably a sport utility vehicle or SUV. The warning or emergency light module 12 is positioned at an intermediate vertical location on the tailgate 10 so as to provide improved visibility for oncoming or trailing traffic. Preferably the warning or emergency light module 12 is placed at an intermediate location on the tailgate preferably between 36 inches and 48 inches above ground level so as to be closer to the eye level of a driver following or oncoming traffic. The light module 12 also extends of a substantial width of the tailgate 10 of the vehicle, and preferably at least one-half of the tailgate width, and more preferably at least three-quarters of the tailgate width.

Figure 2:
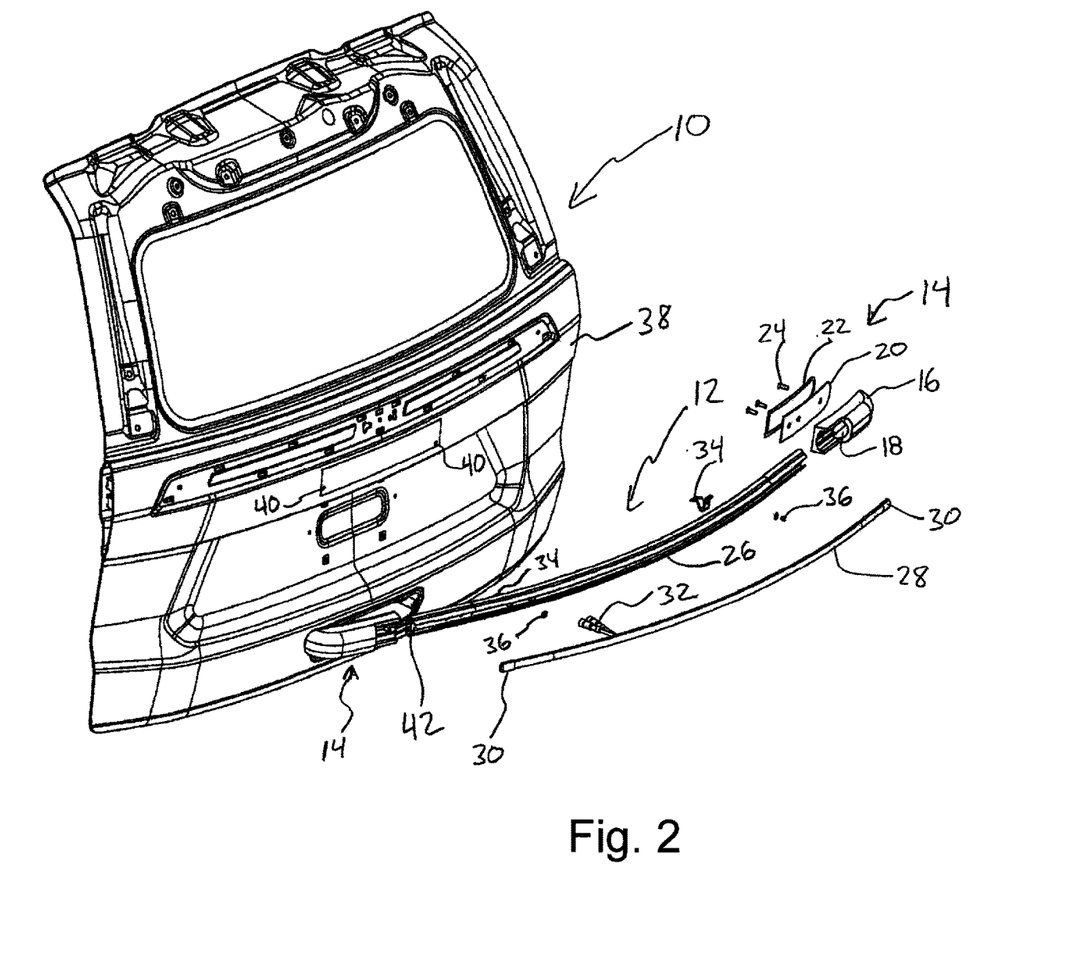
FIG. 2 is a perspective exploded view schematically illustrating the tailgate of a vehicle and the present invention.

FIG. 2 is an exploded perspective view schematically illustrating the warning or emergency light module 12 before being placed on the tailgate 10 of a vehicle. The warning or emergency light module 12 has a light bar 28 placed within the contoured fixture 26. The contoured fixture 26 has an end cap assembly 14 placed on opposing ends of the contoured fixture 26. Each end cap assembly 14 comprises an end cap 16 having an opening 18 for receiving one end of the contoured fixture 26 and a back cover 20. The back cover 20 is attached to the end cap 16 with fasteners 24. An adhesive 22, preferably a pressure sensitive adhesive, is placed on the back cover 20. The light bar 28 is placed within a light bar channel 42 extending longitudinally in the contoured fixture 26. The contoured fixture 26 is curved to match the curve of the tailgate panel surface 38 at the location where the warning or emergency light module 12 is to be placed on the tailgate 10 of the vehicle. Each light bar end 30 of the light bar 28 extends into a respective opening 18 of the end caps 16. A light bar electrical coupling 32 is used to power and control the light bar 28 and may be connected to the electrical wiring of the vehicle and controlled by a controller in the vehicle. Mounting clips 34 and mounting fasteners 36 placed at locations along the longitudinal length of the contoured fixture 26 correspond to tailgate mounting openings 40 in the tailgate panel surface 38 of the tailgate 10. The tailgate mounting openings 40 used in mounting the contoured fixture 26 are preferably preexisting openings in the tailgate 10 of the vehicle and are accessible after removing a trim or other piece original to the vehicle.

Figure 3:
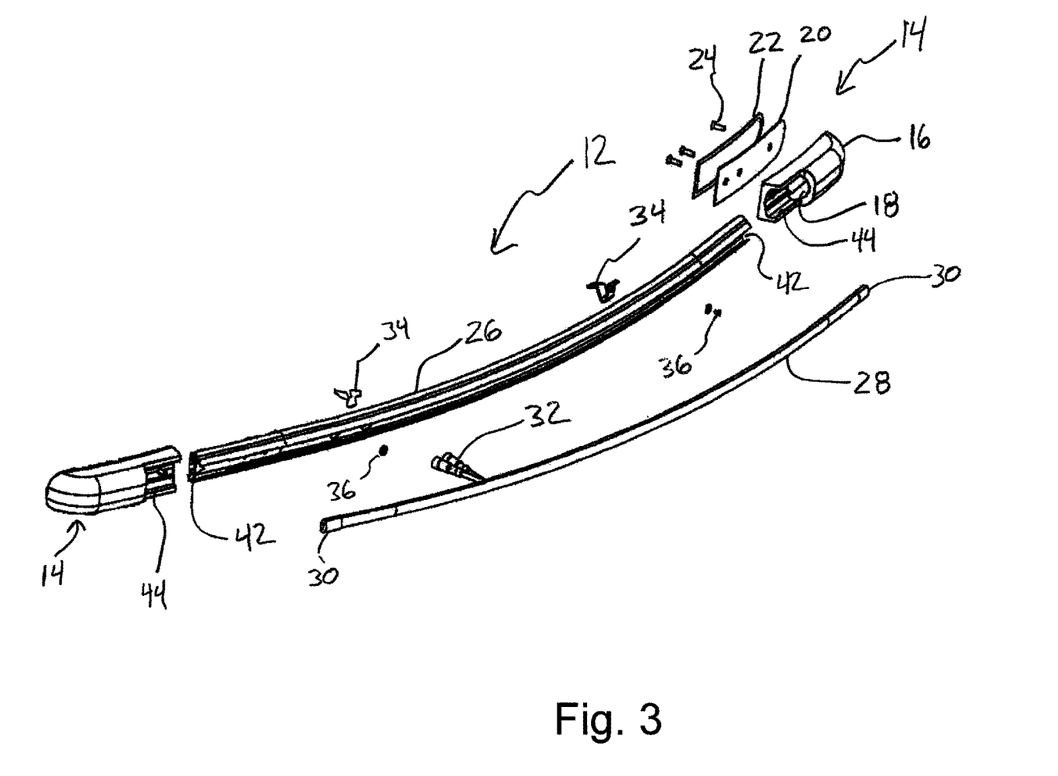
FIG. 3 is a perspective exploded view schematically illustrating the present invention.

FIG. 3 is an enlarged exploded perspective view more clearly illustrating the construction of the warning or emergency light module 12. In FIG. 3 the light bar channel 42 can be more easily be seen. The light bar 28 has a lateral dimension that fits within the light bar channel 42 so that the distal ends of the light bar channel opposing sidewalls curve inward to securely hold the light bar 28 along its longitudinal length. The light bar 28 may be slid into one end opening of the light bar channel 42 of the contoured fixture 26 or may be press and snap fit passing through the lateral opening past the opposing channel sidewalls of the light bar channel 42. When the end caps 16 are slid onto the ends of the contoured fixture 26 the light bar ends 30 of the light bar 28 move into the opening 18 of the end cap 16 securely holding the light bar 28 and light bar end 30 along the curved contour of the contoured fixture 26. Therefore the light bar 28 curves smoothly along the contoured fixture 26 to match the contour of the tailgate panel surface 38 illustrated in FIG. 2. This provides a much more finished look and appearance of the warning an emergency light module 12 when mounted onto the tailgate 10 of a vehicle. Substantially the entire surface of the longitudinal length of the contoured fixture 12 of warning or emergency light module 12 adjacent the tailgate 10 contacts the tailgate panel surface 38 assuring that the warning or emergency light module 12 is securely attached to the tailgate 10.

The contoured fixture 26 of the warning or emergency light module 12 is preferably made of extruded aluminum with the light bar channel 42 formed therein. The light bar channel 42 may be made to accommodate a wide variety of light bars 28 and other components from different manufacturers. The shape of the light bar channel 42 is made having sidewalls that have a lip or edge, or that curve inward so as to contain, secure, and protect the light bar 28.

The contoured fixture 26 is attached at several points with mounting clips 34 to pre-existing tailgate mounting openings 40 on the vehicle. The end caps 16 and back covers 20 are preferably made of molded plastic. The back covers 20 provide substantial contact surface, preferably between one quarter and one half square feet of contact surface for an adhesive attachment to the tailgate panel surface 38.

Preferably, the light bar 28 is made from light emitting diodes or LEDs. Preferably, the light bar 28 includes a controller that provides a variety of lighting patterns including, a left single, right signal, flasher signal, all red brake signal, all blue flashing signal, red and blue alternating signals, time sequences simulate light movement moving longitudinally along the light bar 20, and any other desired light color or pattern.

The contoured fixture 26 may also be applied with the use of adhesive tapes used for bonding panels, such as 3M Scotch brand adhesive tape sold under the trademark VHB. The adhesive tape may be used along the entire surface of the contoured fixture 26 or just on the back covers 20 of the end caps 16. The adhesive 22 is releasable from the contoured fixture 26 or back covers 20 and the tailgate panel surface 38 of the tailgate 10 so as to be removable from the tailgate 10.

In another embodiment of the present invention a roof warning or emergency light module is mounted to the roof of a vehicle. The roof warning or emergency light is mounted similar to a roof rack and permits mounting with a minimum of modification to the vehicle.

Figure 4:
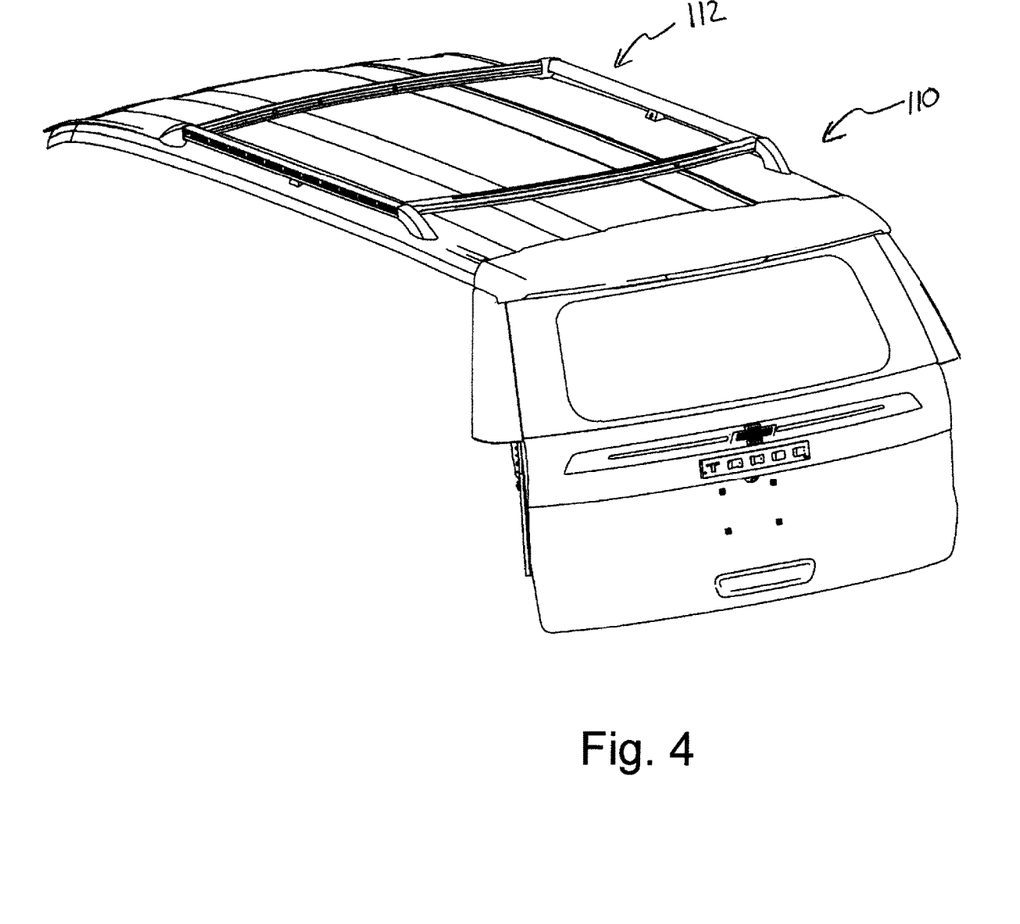
FIG. 4 is a perspective view schematically illustrating a roof of a vehicle with a second embodiment of the present invention mounted thereon.

FIG. 4 is a perspective view schematically illustrating the roof warning or emergency light module 112 mounted on the vehicle roof 110. The roof warning or emergency light module 112 may be mounted on existing mounting points for a roof rack on the vehicle or by a minimal modification to the vehicle.

Figure 5:
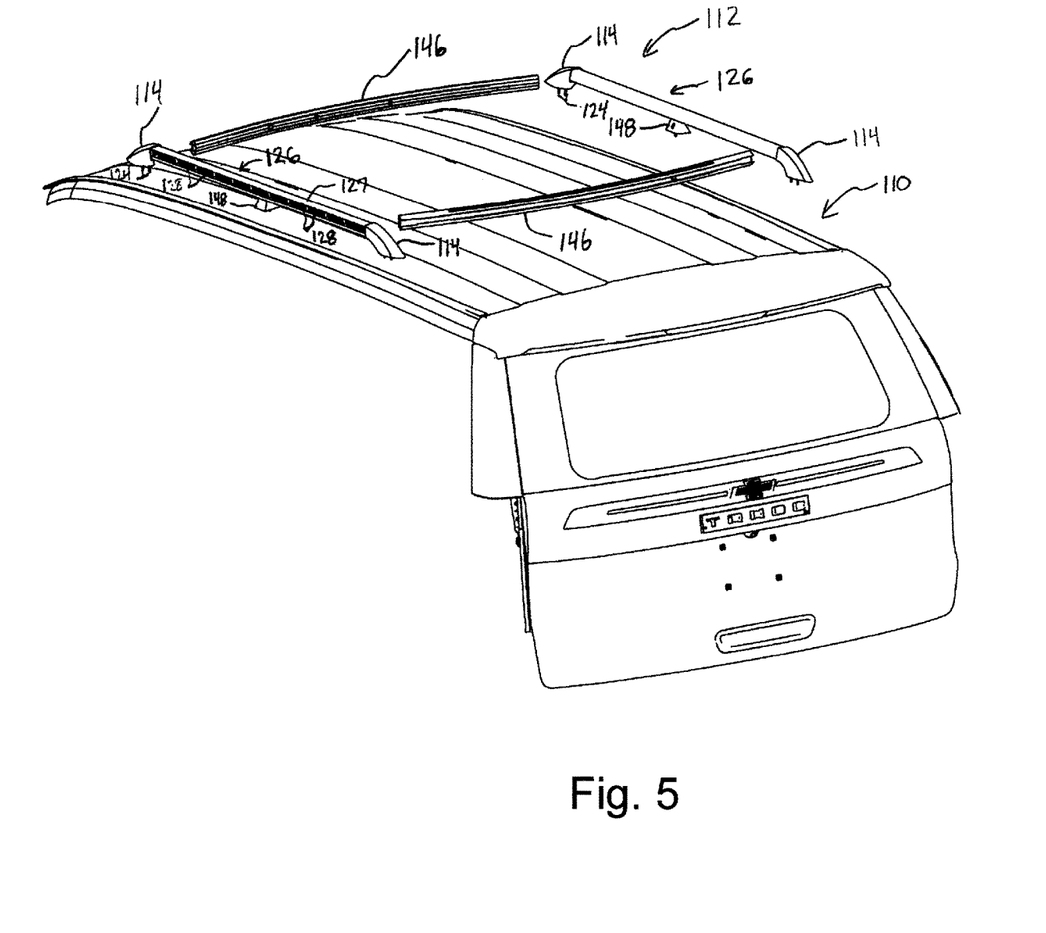
FIG. 5 is a partially exploded perspective view schematically illustrating a roof of a vehicle with the second embodiment of the present invention mounted thereon.

FIG. 5 is a partially exploded perspective view schematically illustrating the roof warning or emergency light module 112 mounted on the vehicle roof 110. The roof warning or emergency light module comprises a pair of rail light fixtures 126. Each one of the pair of rail light fixtures 126 extend longitudinally along the vehicle roof 110. Lights 128 extend along the length of the rail light fixture 126 within a rail 127 forming a light array. The lights 128 may be any color and sequenced in any pattern so as to provide a desired warning or emergency light mode for a particular application.

Attached to each end of the rail light fixture 126 is an end cap assembly 114. The end cap assembly 114 is attached by fasteners 124 to the vehicle roof 110. The end cap assembly 114 may also be attached to the vehicle roof 110 by any conventional attachment structure or means as in a known or conventional roof rack on a vehicle. A rail support 148 may be placed between the ends of the rail light fixture 126 to provide an intermediate support for the rail 127. Transversely connecting each of the rail light fixtures 126, adjacent each end, is a transverse bar 146. Lights may also be placed on the transverse bars 146.

Figure 6:
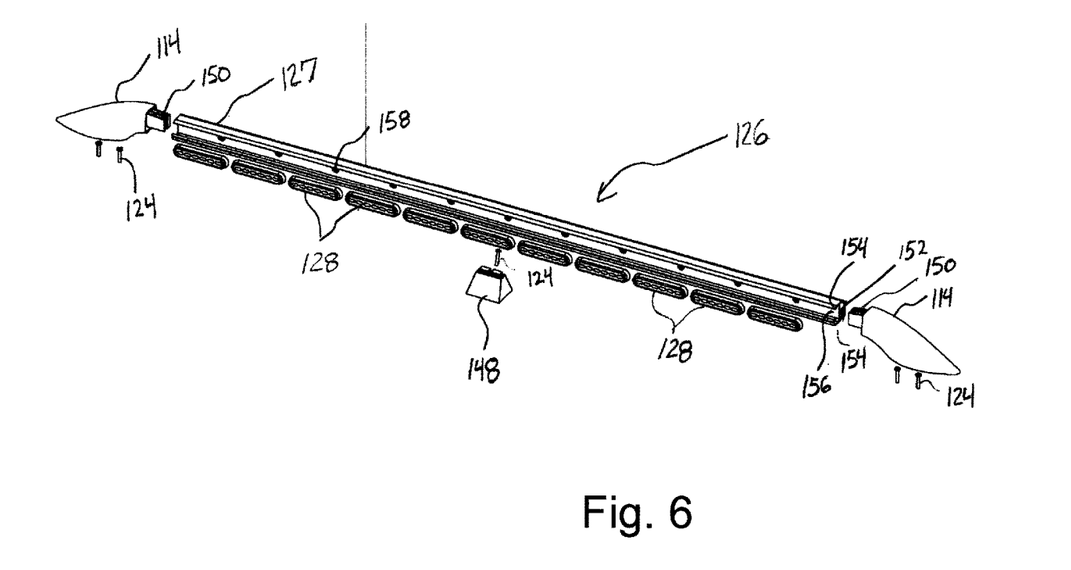
FIG. 6 is an exploded perspective view schematically illustrating one of a pair of rails of the second embodiment of the present invention.

FIG. 6 is an exploded perspective view schematically illustrating one of the rail light fixtures 126 of the roof warning or emergency light module 112. The rail light fixture 126 comprises the rail 127 that has a conduit 152 and an open channel 156 having opposing lips 154 adjacent the opening of the open channel 156. A surface opposite the opening of the open channel 156 has through holes 158 formed therein passing through into the conduit 152. The through holes 158 permit electrical wires placed within the conduit 152 to be routed to each of the lights 128 placed within the open channel 156 of the rail 127.

Each of the end cap assemblies 114 have a rail insert 150 that extends into the rail light fixture 126 holding the end cap assemblies 114 to the rail light fixture 126. Electrical wires may be routed into the end cap assembly 114 from the vehicle to provide power and control the sequencing or turning on-and-off each of the individually controlled lights 128. Accordingly any desired illumination color or sequencing pattern may be provided to each of the lights 128 to provide an emergency or warning light clearly visible from the side of the vehicle.

Figure 7:
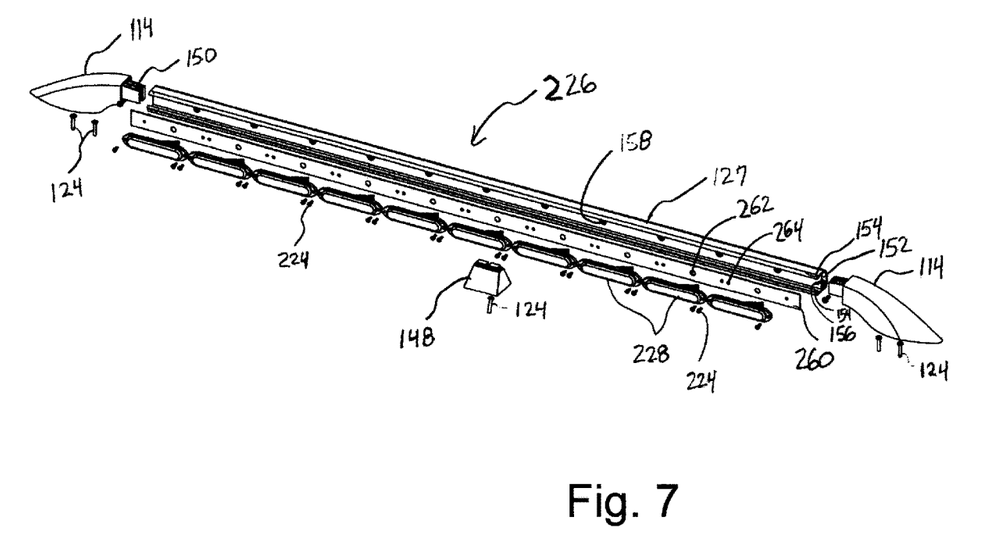
FIG. 7 is an exploded perspective view schematically illustrating one of a pair of rails of a third embodiment of the present invention.

FIG. 7 is an exploded perspective view schematically illustrating another embodiment of the present invention. In this embodiment a light mounting strip 260 is used to felicitate the mounting of the lights 228. The rail light fixture 226 of this embodiment has the light mounting strip 260 placed within the open channel 156 of the rail 127. The light mounting strip 260 is dimensioned so as to be held within the open channel 156 by the opposing lips 154. Each of the lights 228 are held on the light mounting strip 260 by fasteners or screws 224 the fasteners or screws 224 are held within the fastener holes 264. A wire through hole 262 in the light mounting strip 260 corresponds to the wire trough hole 158 in the rail 127 to permit each individual light 228 to be electrically controlled. Each of the lights 228 may be any type of light including light emitting diodes or LEDs. The lights 228 may also be any desired color and controlled on and off in any sequenced to provide any pattern of illumination desired.

Figure 8:
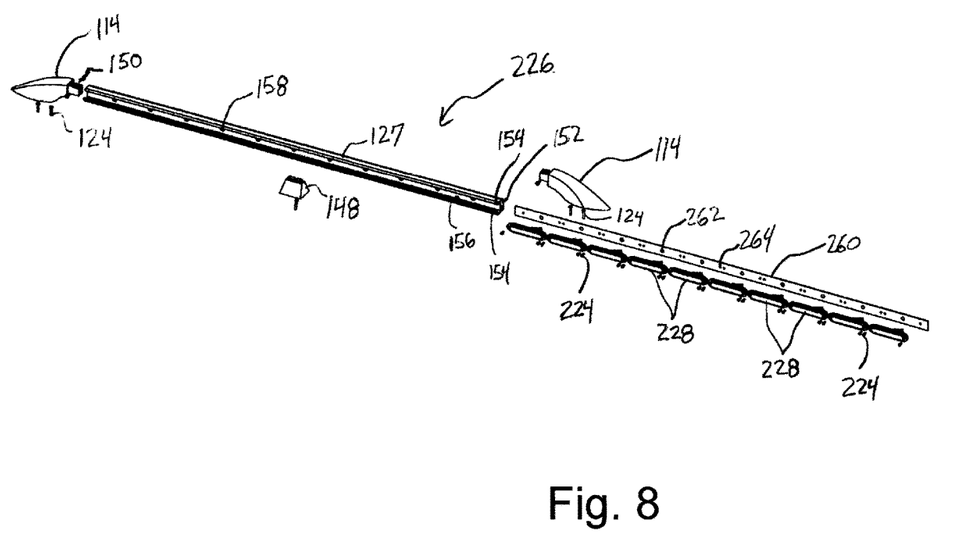
FIG. 8 is an exploded perspective view schematically illustrating the assembly of one of a pair of rails of the third embodiment of the present invention.

FIG. 8 illustrates how the rail light fixture 226 of the embodiment illustrated in FIG. 7 may be assembled with the light mounting strip 260. Prior to inserting the light mounting strip 260 within the open channel 156 in the rail 127 the lights 228 may be mounted on the light mounting strip 260. The mounting strip 260 together with the attached lights 228 may then be slid within one end of the open channel 156 and held in the open channel 156 by opposing lips 154. This may facilitate the assembly of the rail light fixture 226.

The embodiments of the present invention illustrated in FIGS. 4-8 provide a roof warning or emergency light module 112 that may be mounted on a vehicle roof with minimal modification to the vehicle that permits a warning or emergency light to be clearly visible from a side of the vehicle. This is particularly advantageous in situations where an emergency vehicle needs to be placed at an angle or transverse to the direction of traffic. By providing an array of lights running longitudinally from front to back of an emergency vehicle the warning or emergency lights are more clearly seen from a vehicle that is approaching at an angle transverse to the emergency vehicle. This is particularly advantageous when the emergency vehicle is needed to be positioned at an angle to or transverse to a roadway. When a position of an emergency vehicle is necessarily at an angle or transverse to a roadway and the direction of traffic, often lights that are only placed facing forward or rearward are not clearly seen or perceived by oncoming traffic. This creates a hazardous situation to both the emergency vehicle and the oncoming traffic. Additionally, the warning or emergency lights may provide white or daylight type illumination or flood lighting to provide a working light to illuminate a desired area or location. This may be beneficial during an accident or other incident requiring work lighting or sight lighting. Additionally, the warning or emergency lights may be sequenced on and off with timing to indicate movement or flow in a direction so as to guide or alert oncoming vehicles. The warning or emergency lights may be sequenced on and off and controlled by a controller unit in the vehicle.

Accordingly the present invention improves safety by providing embodiments of different easily mountable warning or emergency light modules that permit warning or emergency lights to be easily seen by approaching traffic from any direction.

Although the preferred embodiments of the invention have been illustrated and described, it will be obvious to those skilled in the art that various modifications may be made without departing from the spirit and scope of this invention.

What is claimed is:

1. A warning or emergency light module configured to mount on a panel with an existing opening therein of a tailgate of a vehicle comprising:
    a contoured fixture having a longitudinal light bar channel with opposing sidewalls;
    a light bar held in the longitudinal light bar channel, said light bar comprising a plurality of controllable lights, whereby a warning or emergency light is configured to be selectively displayed;
    an end cap placed on each end of said contoured fixture covering a portion of said light bar; and
    a mounting clip attached to said contoured fixture, wherein said mounting clip is positioned on said contoured fixture to mate with the existing opening in the panel of the tailgate of the vehicle, whereby said contoured fixture is configured to be removably mounted on the panel of the tailgate of the vehicle without modification to the vehicle.

2. The warning or emergency light module as in claim 1 wherein: said contoured fixture has a fixture contour matching a panel contour of the panel of the tailgate of the vehicle.

3. The warning or emergency light module as in claim 1 wherein: ends of the opposing sidewalls of said contoured fixture extend over a portion of said light bar.

4. The warning or emergency light module as in claim 3 wherein: ends of the opposing sidewalls form a snap-fit with said light bar.

5. The warning or emergency light module as in claim 1 further comprising: a back cover placed on the end cap placed on each end of said contoured fixture; and an adhesive placed on the back cover.

6. The warning or emergency light module as in claim 5 wherein: the adhesive comprises a pressure sensitive adhesive.

7. The warning or emergency light module as in claim 1 wherein: said contoured fixture comprises extruded aluminum.

8. The warning or emergency light module as in claim 1 wherein: said contoured fixture comprises plastic.

9. The warning or emergency light module as in claim 1 wherein: said light bar comprises LEDs.

10. A warning and emergency light mounted on a tailgate of a vehicle comprising:
    a tailgate of a vehicle having a panel with existing openings therein, the existing openings located at an intermediate location on the tailgate;
    a contoured fixture having a longitudinal light bar channel with opposing sidewalls;
    a light bar held in the longitudinal light bar channel, said light bar comprising a plurality of controllable lights, whereby a warning or emergency light is configured to be selectively displayed;
    a mounting clip attached to said contoured fixture, wherein said mounting clip is positioned on said contoured fixture to mate with the existing openings in the panel of the tailgate of the vehicle,
    whereby said contoured fixture is configured to be removably mounted on the panel of the tailgate of the vehicle without modification to the vehicle.

* * * * *